April 25, 1961 L. C. BRISSON 2,981,377
BRAKE CONTROL MECHANISM
Filed April 4, 1958 4 Sheets-Sheet 3

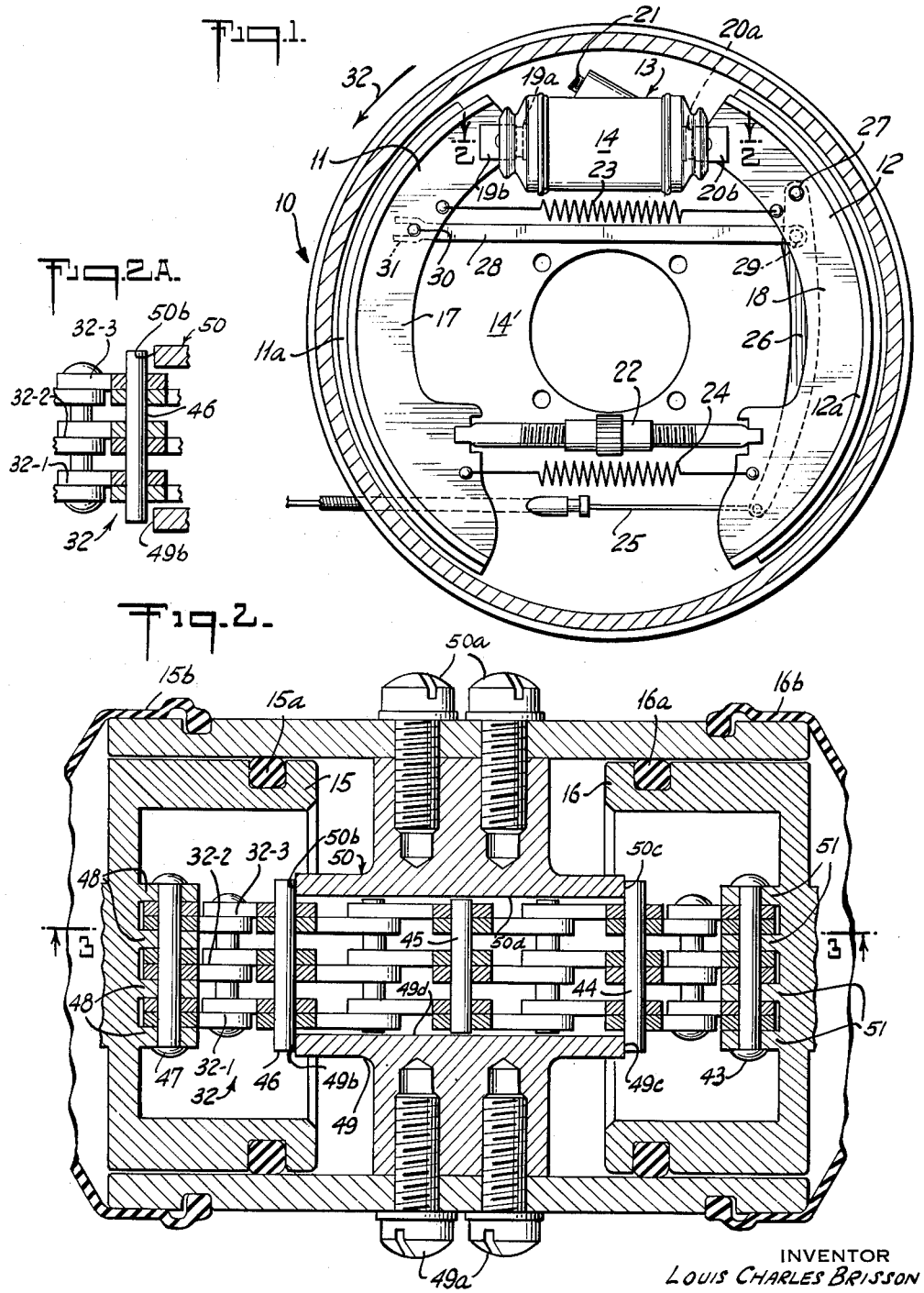

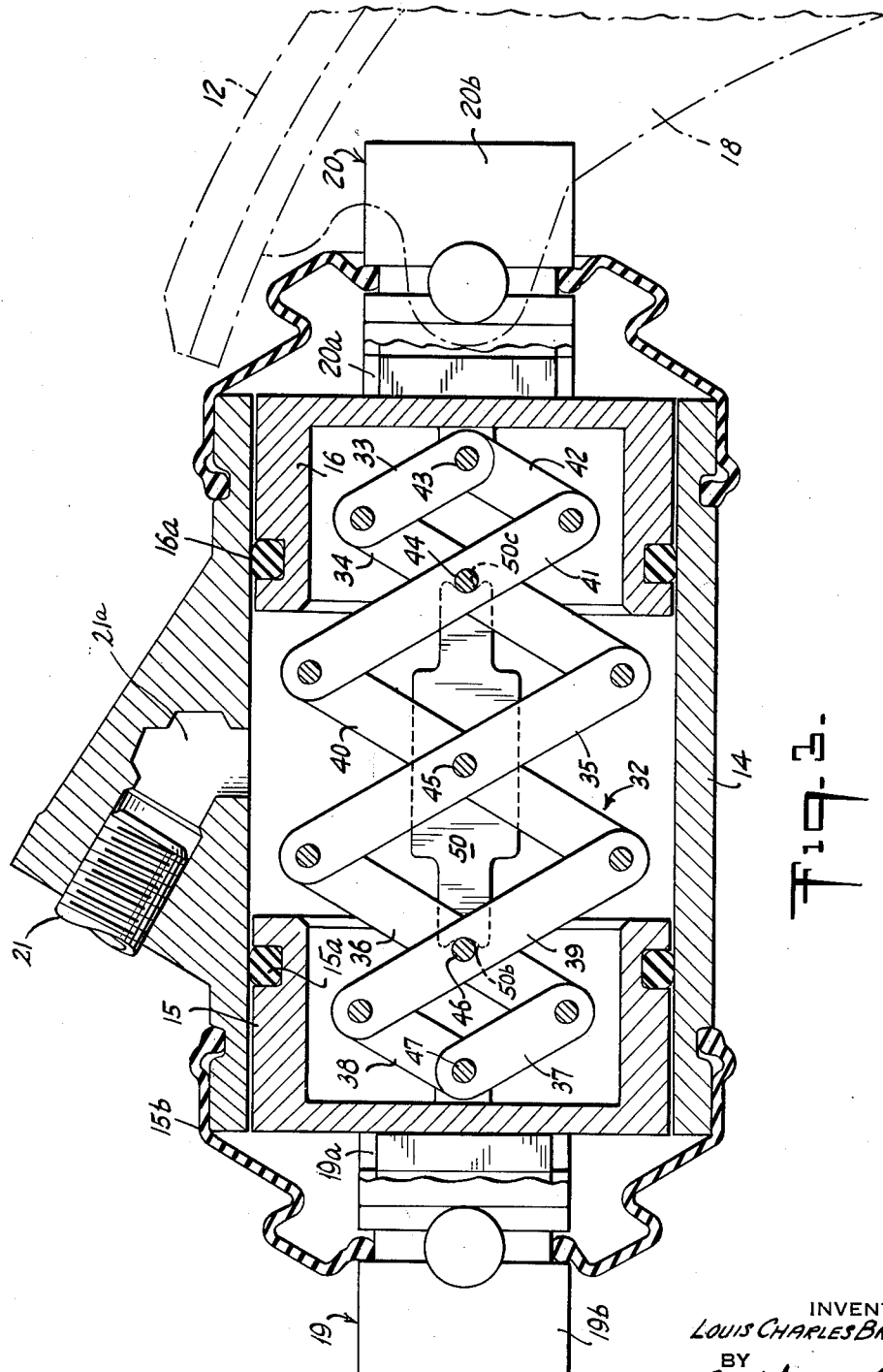

INVENTOR
LOUIS CHARLES BRISSON
BY Mitchell Bechert
ATTORNEYS

April 25, 1961    L. C. BRISSON    2,981,377
BRAKE CONTROL MECHANISM
Filed April 4, 1958    4 Sheets-Sheet 4
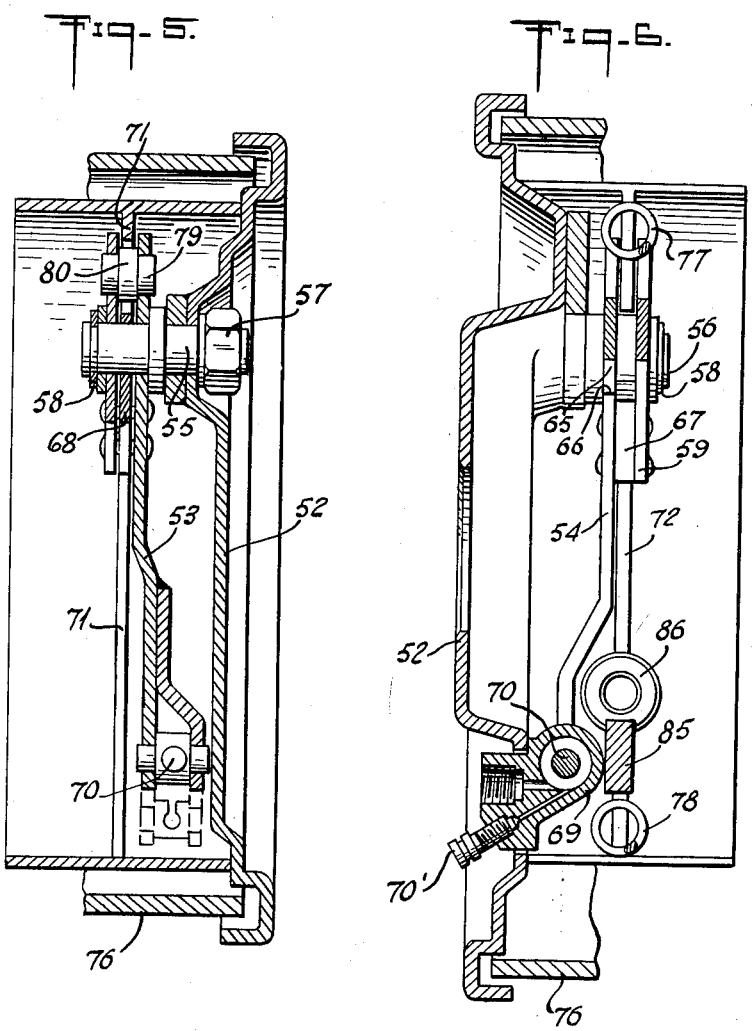
INVENTOR
LOUIS CHARLES BRISSON
BY
ATTORNEYS United States Patent Office 2,981,377
Patented Apr. 25, 1961

2,981,377
BRAKE CONTROL MECHANISM
Louis Charles Brisson, 8 Rue de la Duchesse de Chartres, Oise, France
Filed Apr. 4, 1958, Ser. No. 726,381
13 Claims. (Cl. 188—78)

This invention relates to brakes. More particularly the invention relates to brake systems for use in motor vehicles or the like.

This application is a continuation-in-part of the applicant's copending application, Serial No. 683,262, filed September 11, 1957.

In automotive brake systems, it is known that the two shoes which engage the drum on opposite sides of the center of rotation behave differently under the reaction pressures of the moving drum on the shoes. In the applicant's copending application, Serial No. 651,477, filed April 8, 1957, there is disclosed a hydraulically actuated brake system wherein the different reaction pressures on the two shoes generate shoe motions which are harnessed to further activate the hydraulic system in a manner which achieves highly improved efficiency and regularity of action over a wide range of operating conditions. The invention of this copending application is particularly useful when self-locking conditions obtain in the brake system because it is able to supply a force to the primary shoe which effectively overcomes the self-lock, thereby rendering the brake system fully controllable at all times. The present invention has as one of its objects to achieve many of the improved functions of that hydraulic system utilizing, however, mechanical linkages to accommodate and transmit the heavier stresses attendant the braking process, thereby obviating the consequences of failure of the relatively less durable hydraulic components.

Another object of the invention is to provide a mechanically compensated brake system which achieves highly regular braking action.

Another object of the invention is to provide brake mechanism which is at least partially mechanical in nature and which is capable of fully controlling a self-locking brake action to achieve a brake system of consistently high efficiency.

Another object of the invention is to provide a brake system which is robust in construction and both simple and inexpensive to manufacture.

Still another object of the invention is to provide a brake system which is free of the normal shortcomings of hydraulic systems of the same general type including, for example, freedom from the problems of high-pressure hydraulic-seal leakage and high-pressure seal friction.

Briefly stated, my invention contemplates a reversible, fully compensated brake organization involving two shoes pivotally mounted within a drum and differentially actuated for engagement with the drum. Depending on the direction of drum rotation, one of the shoes will tend to self-lock, and I employ novel mechanical-linkage and leverage means interconnecting the shoes and including a frame-based (i.e. non-rotatable) reference for assuring not only that self-locking will be avoided, but also for assuring even distribution of braking effort for the two shoes. The mechanism is so devised that for a rotating drum, the self-locking tendency of the primary shoe will drive the secondary shoe so strongly against the frame-referenced linkage that the primary shoe will be withdrawn, and actual self-locking cannot occur, the net result being even braking effort by both shoes.

According to one preferred embodiment of the invention, the actuators and supports for the shoes are so arranged that the different reaction pressures which occur on the primary and secondary shoes generate motions in the shoes which are impressed on a mechanical linkage cross-connected between the shoes to stress the primary shoe against self-locking to afford a smooth and nearly constant braking action. To this end, the upper ends of the two shoes are coupled through a bidirectional motion-modifying and motion-reversing linkage, such as a pantograph lever system, whereby shoe movement deriving from drum reaction thereon causes one of the shoes to be urged in a direction away from the drum. In one arrangement of the invention, a simple and relatively low pressure hydraulic actuator system is integrated with the high stress mechanical system by housing the mechanical parts in the hydraulic medium and coupling them directly to the hydraulic pistons.

In another preferred form of the invention a pair of levers are pivotally connected at spaced apart points to a brake plate. These levers are connected, preferably by pin and slot pivotal connections, to a pair of brake shoes which are urged by said levers into engagement with the usual brake drum. The shoes are preferably normally urged toward each other by spring means in the usual fashion and are linked together by a compression link secured thereto, the effective distance of said link from the center of the drum being not more than about 0.5 the radius of the drum. The levers are rocked by hydraulic or mechanical means, which permit the same to float, and such action of the levers urges the shoes into engagement with the brake drum. There is a differential action on the two shoes, due to the direction of rotation of the drum and the friction between the shoes and the drum. The shoes are so interconnected, preferably through the levers and other connecting parts in such a way that one of the shoes has applied thereto a force directed inwardly away from the drum upon the application of a high reaction pressure between the drum and the other shoe. In such manner, the brake is rendered regular in its action and responds properly to the operator pressure, tending to rock the links on their pivots. In one of the forms shown, the connection between shoes preferably consists of extension lever arms on the levers extending across one to the other so that each extension arm has contact with the lever action upon the other lever. Thus, rotation of one lever in one direction tends to rotate the other lever, due to the engagement of the extension lever arm and the abutment which it contacts.

The above and other features and objects of the present invention will be apparent to those skilled in the art by having reference to the following specification describing a preferred embodiment of the invention and taken in conjunction with the accompanying drawings, of which:

Fig. 1 is a view in side elevation of the basic parts of a brake assembly as viewed along the axis of the drum from the outside;

Fig. 2 is a fragmentary view in enlarged scale and in horizontal section, taken substantially in the plane of the line 2—2 of Fig. 1, looking in the direction of the arrows;

Fig. 2A is a fragmentary view of a portion of Fig. 2 showing the mechanism in operation;

Fig. 3 is a correspondingly enlarged and fragmentary view in vertical section, taken substantially in the plane of the line 3—3 of Fig. 2;

Fig. 5 is a sectional view, taken substantially in the plane of the line 5—5 of Fig. 4, looking in the direction of the arrows; and Fig. 6 is a sectional view, taken substantially in the plane of the line 6—6 of Fig. 4, looking in the direction of the arrows.

Figure 4:
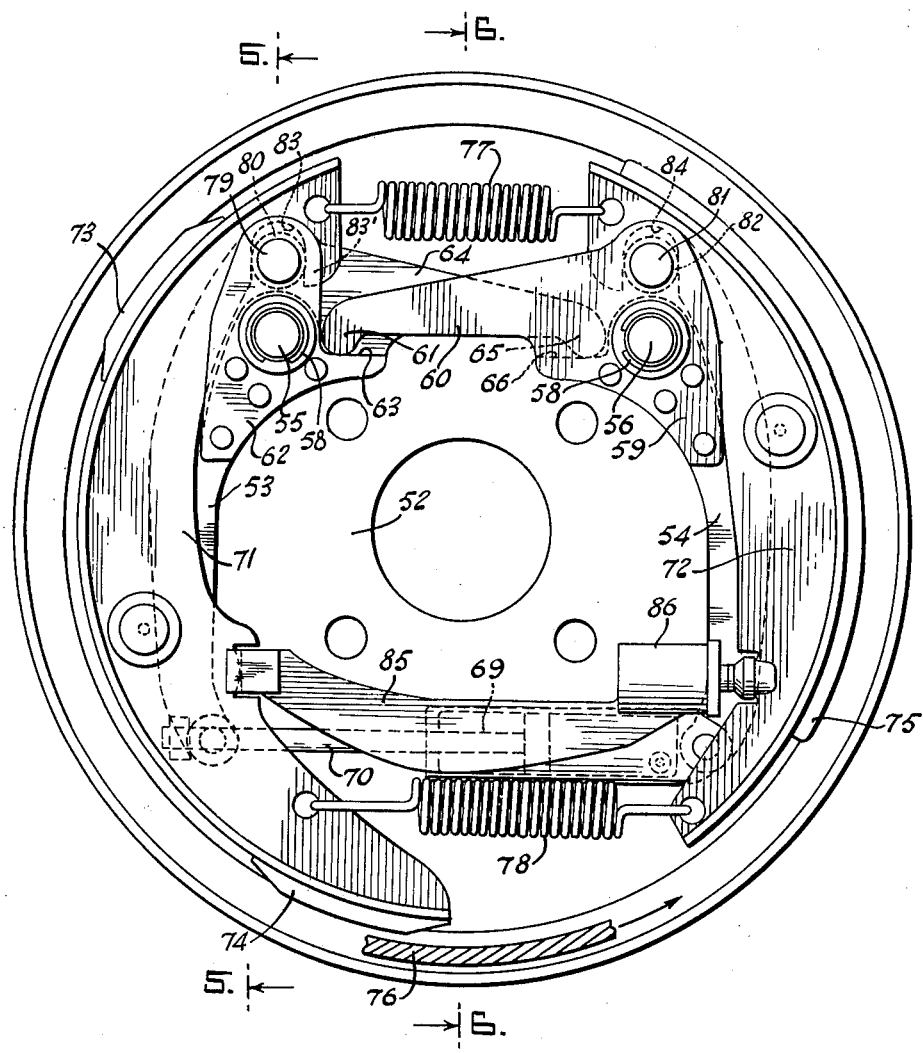
Fig. 4 is a view corresponding to Fig. 1 of a brake system incorporating a modification of the invention.

Referring to the drawings and to Fig. 1 particularly, the invention is illustrated as embodied in a brake system including a cylindrical drum 10 adapted to rotate, for example, with the wheel (not shown) of a vehicle and a pair of segment shaped shoes 11 and 12 suspended, in a manner to be described below, within the drum. The brake shoes, carrying friction surfaces or linings 11a and 12a, are movable in their suspension so that they can be forced into frictional engagement with the inside wall of the drum 10 by means of an actuator indicated generally by the numeral 13.

The actuator 13, in one arrangement of the invention selected for purposes of illustration, includes a hydraulic cylinder 14 preferably fixed to a back plate 14' and within which are mounted a pair of pistons 15 and 16 (Figs. 2 and 3) carrying sealing rings 15a and 16a respectively. The pistons 15 and 16 are joined to webs 17 and 18 respectively of the brake shoes 11 and 12 by couplings 19 and 20. The couplings between the webs and the pistons afford limited freedom of vertical movement, this through the agency of vertical slide channels 19a and 20a within which slide members 19b and 20b are slidably received, as with a dovetail engagement. The shoes can, therefore, shift circumferentially in their floating mount while in engagement with the drum, the cylinder 14 remaining fixed. Flexible sealing leaves 15b and 16b protect the outer ends of the pistons 15 and 16, as well as the cylinder ends from dirt. The slide members 19b and 20b are in turn pivotally connected to the brake shoe webs. The two pistons are adapted to be driven apart or outwardly toward their respective shoes by hydraulic pressure introduced from a suitable source such as a master cylinder through a hydraulic inlet conduit 21 and ducts 21a to the center portion of the cylinder 14 between the two pistons.

The lower portions of the shoes 11 and 12 are coupled through an adjustable compression link 22 disposed on the opposite side of the axis of rotation of the drum 10 from the actuator 13, the link 22 being coupled to the respective webs 17 and 18 to afford limited freedom for angular movement. The webs 17 and 18 are also connected by a pair of retracting or tension springs 23 and 24 disposed on opposite sides of the axis of drum rotation and normally holding the shoes 11 and 12 out of engagement with the drum. It will be understood, therefore, that the shoes 11 and 12 are supported within the drum with certain freedom of movement both radially and circumferentially of the drum in what is commonly termed a floating and self-centering mounting. In the illustrated arrangement the effective line of the compression link 22 is located approximately 0.275 the radius of the drum measured from the center of rotation of the drum. This contributes to self-locking action in the brake system which will be discussed more fully below.

If desired, an emergency mechanical brake-actuating linkage can be provided in the form of an emergency brake cable 25 connected to the free end of a swinging lever 26 pivotally connected at 27 to the web 18 of the brake shoe 12. A tie link 28 is pivotally connected at 29 to the lever 26 and is joined at its other end to the web 17 of the shoe 11 through a slide coupling including a pin 30 on the web 17 and a slotted tip 31 on the end of the tie link 28. When the cable 25 is pulled to the left, as viewed in Fig. 1, the brake shoes are driven apart and into engagement with the drum 10 by the action of the articulated tie link 28 and swinging lever 26.

In the course of normal operation of a brake system of the type described above, when the brake shoes 11 and 12 are urged into frictional engagement with the rotating drum 10 by the actuator 13, the reaction pressures of the drum on the two brake shoes differ. Assuming the drum 10 is rotating in a counterclockwise direction, as indicated by the arrow 32, the shoe 11 becomes the primary shoe and the shoe 12 the secondary shoe. The two shoes and the compression link 22, as a coupled system, will be urged in a counterclockwise direction around the axis of drum rotation.

The two shoes will not, in the normal course of operation, apply equal restraining or braking forces to the drum and the ratio of the forces as well as the nature of the brake operation will vary with such parameters as the coefficient of friction between the working surfaces, the working surface areas, the spacing of the compression link 22 from the drum center, the hydraulic pressure in the cylinder 14. When the brake is in operation, it is possible for the shoes to attain a state of equilibrium in which there is either a zero opening force or a negative force, i.e. a force directed to the right at the upper end of the primary shoe 11, as viewed in Fig. 1. The brake system is then said to be self-locking in that it cannot be released by the normal controlling means. Conventionally, brake systems are designed so that under no conditions will they become self-locking.

In accordance with the applicant's invention as disclosed in his said copending application, Serial No. 651,477, countermeasures can be built into a highly efficient brake system of the self-locking type to achieve a high degree of regularity of braking action and to obviate the self-locking action. The present invention achieves these ends by means of a positively acting mechanical linkage, seen particularly in Figs. 2 and 3.

The inner ends of the pistons 15 and 16 are coupled to each other through a linkage indicated generally by the numeral 32, the linkage operating to afford limited freedom of relative movement between the pistons, to amplify inward motion of either piston beyond the limits of freedom, and to reverse the direction of the amplified motion. The linkage includes a first system of articulated levers 33, 34, 35, 36, 37 and a second system of articulated levers 38, 39, 40, 41, and 42 coupled at their respective ends to the pistons 15 and 16 and themselves pivotally linked at their crossing points by pivot shafts 43, 44, 45, 46, and 47 to form a so-called pantograph or lazy tongs type linkage in which the pivot shafts 43 and 47 are coupled by means of lugs 48 and 51 to the pistons 16 and 15. As seen in Fig. 3, the linkage can be strengthened by stacking duplicate lever systems on common pivot axes, three stacked systems 32—1, 32—2, and 32—3 being used in the illustrated arrangement.

The pivot shafts 44 and 46 are extended at either end to engage, when the pantograph linkage is actuated in a manner to be described, abutment pieces 49 and 50, secured as by bolts 49a and 50a to the inner wall of the cylinder 14. Each abutment piece, 49 and 50, includes a pair of abutment points 49b and 49c and 50b and 50c (Fig. 3) which are preferably concavely rounded to receive the shafts 44 and 46. The opposed flat faces 49d and 50d of the abutment pieces define a slide channel which stabilizes the linkage 32 against lateral distortion away from the common axis of the pistons 15 and 16. The shafts 44 and 46 are normally abutting against their respective abutments 49c—50c and 59b and 50b. Outward axial movement of both pistons is not limited, providing, however, that movements are more or less equal as between the two pistons.

In operation, assuming the drum 10 is rotating in a counterclockwise direction, the hydraulic fluid within the cylinder and between the pistons is subjected to pressure from the master cylinder to drive the two pistons outwardly and away from each other to press the shoes 11 and 12 against the drum. The reaction pressure of the drum on the shoes urges the shoes, as a coupled system, in a counterclockwise direction. The secondary shoe will be driven, through a combination of its own drum reaction pressure and the reaction pressure of the primary shoe as transmitted through the compression link 22, against its actuating piston 16, driving it inward against the fluid pressure of the hydraulic system. The slide coupling 20a allows the shoe 12 to move or shift with the drum while transmitting a major component of its motion in a direction axial with respect to the hydraulic cylinder 14.

During the braking action the shaft 46 of the lever linkage 32 will be separated from its abutments 49b and 50b, as best seen in Fig. 2A. The pivot shaft 44, however, will have re-engaged its abutments 49c and 50c, whereupon an axially inward force will be applied by the linkage to the piston 15. This force will tend to urge the shoe 11 away from the drum and self-locking of the brake system will not occur. The illustrated linkage affords, in addition to a reversal of force direction, a magnification of motion and a step down in the ratio of applied forces as between the pistons 16 and 15. There results a compensating force on the primary shoe 11, which, when the force ratios are properly selected in relation to the other brake system parameters (including the position, radially speaking, of the compression link 22), will put the brake system in balance, preventing possible self-locking and establishing regular braking action.

It will be observed that the linkage 32 is bidirectional and that a similar action will occur when, for example, the drum is rotating in a clockwise direction to render the shoe 12 primary and the shoe 11 secondary. Also, the compensating action forces are applied axially of the pistons and, in the illustrated arrangement, the mechanical advantages are equal for both directions of linkage operation. Moreover, the linkage in the illustrated embodiment, being fully enveloped in the hydraulic medium, is fully protected against damage, including corrosion.

The invention illustrated at Figs. 1–3 can take various other forms and arrangements to accommodate a wide range of brake designs. Thus, for example, the motion and force multiplication ratio can be changed for either the counterclockwise or clockwise directions of drum rotation, or for both directions. Different ratios for both directions can be attained, in accordance with well known lever mechanics by changing the lengths of the lever arms of the linkage 32 between pivot points. Also, the placement of the abutment locations can be changed to change the multiplication factors, and the abutments need not be placed symmetrically, but can favor one direction of motion over the other. Thus the abutments 49c—50c can be placed adjacent the pivot shaft 45 and that shaft elongated similarly to the shaft 44. Moreover, the abutments can be placed off the axis of the pistons as viewed in Fig. 3. The invention can also be applied to a fully mechanical brake system by, for example, utilizing mechanical spreaders to urge the pistons or members 15 and 16 outwardly or, alternatively the linkage 32 can be separated entirely from the basic brake actuating mechanism.

Referring now to Figs. 4–6, there is shown a brake system having a different mechanical arrangement for accomplishing generally similar results. The system includes a usual brake plate 52 of desired proper design, and on this brake plate are mounted two levers 53—54. These levers are pivotally mounted and, in the preferred form, are mounted on pins 55—56 rigidly secured to the brake plate or back plate 52 as by means of nuts 57, as shown in Fig. 5. The levers may be held on the pins as by means of the washers and split wire rings 58.

The levers are interconnected in such a way that rocking one of the levers about its pivot in one direction tends to rotate the other lever about its pivot in one direction. In the form illustrated, the lever 54 has an auxiliary plate or lever part 59 secured thereto and providing an extension lever arm 60, which has a lever end 61, as will be clear. The other lever 53 preferably has a lever plate 62 secured thereto, as by means of rivets, and this plate 62 has an abutment surface 63 for engagement by the lever end 61 on the lever 60, carried by the lever 54. The lever 53 has an extension lever arm 64, having an end 65, for engagement with an abutment surface 66 on the other lever 54. It will be seen that the two extension levers 60—64 are in different planes so that they may cross each other, as shown particularly in Fig. 4. The lever 54 and its attached auxiliary extension lever plate 59 may be separated as by means of a spacer plate 67 or the like, while the lever 53 and its auxiliary extension lever plate 62 may be spaced by a spacer 68.

The two levers at the bottom ends are connected together so as to rock the same about their pivots by any suitable means, but in the form shown there is a fluid-pressure cylinder 69 and a piston rod 70 having a piston in the cylinder 69; cylinder 69 and rod 70 are connected only to the two levers 53—54 and may therefore "float" with respect to the back plate 52. Thus, upon the application of pressure fluid through the connection 70' (Fig. 6) to the piston, the two lower ends of the levers will be drawn toward each other.

The upper ends of the levers 53—54 are pivotally connected to a pair of brake shoes 71—72. In the form shown, these shoes are segmental in shape. The shoe 71 has friction brake surfaces 73—74 while the brake shoe 72 has a friction band 75. It might be here stated that the two shoes are normally urged toward each other and out of engagement with the brake drum 76 by tension springs 77—78, as will be understood. The pivotal connection between the upper ends of the levers 53—54 and the respective shoes 71—72 may be in the form of pivotal pin and slot connections. In the form illustrated, each of the levers, for example the lever 53 and its auxiliary lever or plate 62, carry a pin 79 between them and between the two lever parts the pin rotatably carries a bearing sleeve 80. The other lever 54 and its auxiliary lever or plate 59 carry a similar pin 81 and a bearing sleeve 82, both corresponding to the same parts shown particularly in Fig. 5. The web of the brake shoe 71 cooperates with the sleeve 80, and in the form shown the shoe web has an elongated notch or slot 83 extending into the same so as to provide a hook 83', which in effect hooks over the bearing sleeve 79. Thus, the shoe 71 is both pivotally and slidably connected to the lever 53. The shoe 72 has a similar slot or notch 84 defining a hook, which hooks over the bearing sleeve 82 the same as in the other case. Thus, rocking of the levers 53—54 will rock the shoes 71—72, as will be understood.

The shoes are linked together by a compression link 85, which is adjustable as to length as by means of an adjustment screw means 86. The effective line of the compression link 85, that is, the line joining the two points of connection between the link and the shoes, is preferably not distant from the center of the drum more than about 0.5 the radius of the drum, and in the form shown in Fig. 4 this distance is roughly 0.3 the radius of the drum.

The operation is substantially as follows:

The lower ends of the levers, which are floatingly mounted on the back plate, just as the shoes are floatingly mounted within the drum, are drawn together by means of the piston and cylinder means 69—70 or other means for coupling and drawing the levers together. By drawing the lever ends toward each other, the levers are rocked about their pivots 55—56 and through the pins 79—81 and the bearing sleeves 80—82 within the hook slots of the shoe webs, the shoes are moved out into engagement with the inside of the drum 76. The effect of the rotating drum is different as between the two shoes. The shoe 71, which is considered the primary shoe when the drum rotates counterclockwise, that is, in the direction of the arrow, and the shoe 72 are driven in a counterclockwise direction with drum. This action of the rotating drum on the two shoes acts through the pins 79—81 and their bearing sleeves 80—82 so as to tend to rock both levers in a counterclockwise direction. Since the shoes are floating and the levers are also floating, the drum reaction on the shoe 72 tends to increase, and any increase in that pressure is transmitted to the pin 81, which in turn tends to rock about its pivot 56. Such rocking of the lever 54 in a counterclockwise direction about its pivot 56 acts through the lever arm 60 and extension lever end 61 to tend to rotate the lever 53 in a clockwise direction. Now the forces acting on the lever 53 essentially are three in number: 1, the initial force acting through the piston rod 70 tending to rotate the lever 53 in a counterclockwise direction; 2, the force of the extension lever arm 60 tending to rotate the lever 53 in a clockwise direction; and 3, the reaction pressure of the drum on the shoe 71, which acting through the pin 79 may be in a clockwise or counterclockwise direction, so as to maintain the lever 53 in equilibrium. It should be noted that the forces acting on the shoe 71 are the forces transmitted through the pin 79, the reaction pressure through the compression link 85, and the drum reaction pressure to the right on the shoe 71. It may be said that the position of the resultant drum reaction pressure on the shoe depends largely upon the coefficient of friction between the shoe 71 and the drum. With a normal or high coefficient of friction, the resultant drum reaction pressure on the shoe 71 acts to the right in a position below the line of the link 85. With that reaction pressure toward the right and the link reaction pressure toward the left and at a somewhat lower value, the pressure on the pin 79 must be to the right to cause the shoe 71 to remain in equilibrium and a self-locking situation exists. This effect is counteracted by the lever system. Thus, depending upon the coefficient of friction between the shoe 71 and the drum, the forces acting on the lever 53 at the pin 79 may be clockwise or counterclockwise, as indicated above. Thus, the shoe 71 has a tendency to move to maintain the braking action uniform and not irregular as with the prior art devices of the same general character.

If the drum rotation should be in the opposite direction, the shoe 72 would become the primary shoe, and the shoe 71 would be the secondary shoe, and the actions would be reversed from that heretofore described. Therefore, no matter which way the drum rotates, the action of the brake will be substantially the same because the action of one shoe when the drum rotates in one direction will be the action of the other shoe when the drum rotates in the opposite direction.

It will be seen, then, that I have provided a brake which will be regular in its action and operate more smoothly and in accordance with the operator's foot pressure than prior-art brakes of the same general character. Moreover, the brake can be operated under conditions which would normally result in self-locking.

While the invention has been described in considerable detail and two preferred forms illustrated, it is to be understood that various changes and modifications may be made within the scope of the invention as defined in the appended claims.

I claim:

1. In a brake, a brake plate, a pair of brake shoes to engage a rotatable brake drum, actuating means for urging said shoes into engagement with the drum, and connecting means including reversibly symmetrical levers between said shoes having a fulcrum reaction against said brake plate and directly acting upon one of said shoes in a direction away from said drum upon the application of a reaction pressure between the drum and the other of said shoes for one direction of rotation of said drum.

2. In a brake, a brake plate, a pair of brake shoes to engage a rotatable drum, said shoes being linked together by an abutment link, the effective line of said link being spaced from the drum center not more than about 0.5 the radius of the drum, actuating for urging said brake shoes into engagement with the drum, and means including reversibly symmetrical levers between said shoes having fulcrum reaction with reference to said brake plate and directly acting upon one of said shoes in a direction away from said drum upon the application of a high reaction force of the drum on the other of said shoes for one direction of rotation of said drum.

3. In a brake having a drum and at least a pair of complementary shoes floatingly mounted in the drum for movement relatively to each other and to the drum, actuating means to spread the shoes to frictionally engage the drum, a brake plate, first coupling means joining the shoes on one side of the axis of the drum to transmit forces therebetween, and second coupling means joining the shoes on the other side of the axis of the drum including reversibly symmetrical motion reversing linkage referenced to said plate and responsive to movement of one shoe in the general direction of drum rotation to directly retract the other shoe away from the drum.

4. A brake as set forth in claim 3, said motion reversing linkage including motion amplifying lever means.

5. In a brake having a drum and at least a pair of complementary shoes floatingly mounted in the drum for movement relatively to each other and to the drum, actuating means to spread the shoes to frictionally engage the drum, a brake plate, first coupling means joining the shoes on one side of the axis of the drum to transmit forces therebetween, and second coupling means joining the shoes on the other side of the axis of the drum including motion-reversing linkage referenced to said plate and responsive to movement of one shoe in the general direction of drum rotation to directly retract the other shoe away from the drum, said actuating means to spread the shoes comprising a hydraulic cylinder having a pair of pistons connected respectively to the shoes, said motion-reversing linkage being mounted within the cylinder and coupled to the pistons therein.

6. A brake, comprising a drum and a pair of complementary shoes floatingly mounted within said drum for movement relatively to each other and to the drum, actuating means to spread said shoes for frictional engagement with said drum, a brake plate, first coupling means connecting said shoes on one side of the drum axis to transmit forces therebetween, second coupling means connecting said shoes on the other side of said drum axis and including motion-reversing linkage referenced to said plate and responsive to movement of one shoe in the general direction of drum rotation to urge the other shoe away from said drum, said motion-reversing linkage comprising a series of articulated lever arms pivotally connected as a pantograph linkage having opposed ends, one of said ends being connected to one shoe and the other of said ends being connected to the other shoe, the reference to said plate comprising abutment means coacting between said plate and a part of the pantograph linkage intermediate said ends, whereby both ends of the linkage can move outwardly, with inward movement of either end of the linkage establishing engagement with said abutment means to urge the opposite end inwardly.

7. In a brake having a drum and at least a pair of complementary shoes to frictionally engage the drum, means to support the shoes for radial and circumferential floating movement within the drum including compression link means joining adjacent ends of the shoes on an effective line which is spaced radially from the axis of the drum, and actuating means between the other adjacent ends of the shoes on the other side of the axis of the drum from the compression link means to spread the shoes to establish frictional engagement with the drum, and reversibly symmetrical motion reversing linkage on said other side of the drum axis and coupling the shoes, said linkage being responsive to movement of one shoe in the direction of drum rotation and directly acting upon the other shoe in a direction away from the drum at said other end of the shoe.

8. In a brake having a drum and at least a pair of complementary shoes to frictionally engage the drum, means to support the shoes for radial and circumferential floating movement within the drum including compression link means joining adjacent ends of the shoes on an effective line which is spaced radially from the axis of the drum, and actuating means between the other adjacent ends of the shoes on the other side of the axis of the drum from the compression link means to spread the shoes to establish frictional engagement with the drum, and motion-reversing linkage on said other side of the drum axis and coupling the shoes, said linkage being responsive to movement of one shoe in the direction of drum rotation and directly urging the other shoe in a direction away from the drum at said other end of the shoe, said actuating means comprising fixed hydraulic cylinder means having a pair of pistons coupled respectively to said shoes, said motion-reversing linkage being connected between said pistons.

9. A brake as set forth in claim 7, said motion reversing linkage comprising a system of articulated lever arms pivotally linked together as a pantograph linkage having opposed ends, one of said ends being connected to one shoe and the other of said ends being connected to the other shoe, and fixed abutment means intermediate the ends of the linkage to be engaged thereby to arrest motion of the pantograph linkage between its ends, whereby the two ends of the linkage are urged toward each other as a function of the abutment position relative to the length of the pantograph.

10. A brake as set forth in claim 7, said compression link being spaced from the drum center not more than about 0.5 the radius of the drum, whereby a self-locking brake system is established, said motion reversing linkage preventing actual locking thereof.

11. A brake as set forth in claim 9, said abutment means including a first abutment to be engaged upon inward compression movement from one end of the pantograph linkage and a second abutment to be engaged upon inward compression movement from the other end of the linkage.

12. Brake actuating means for a pair of brake shoes which operate in conjunction with a brake drum, comprising a pair of movable members adapted to be connected respectively to the pair of brake shoes, a brake plate, actuating means to move the members in a direction to urge the shoes outwardly, and reversibly symmetrical linkage means coupled to the two members and including a fulcrum abutment with a part of said plate and responsive to movement of at least one member to directly act upon the other member in a direction tending to urge its corresponding shoe away from the drum.

13. Brake actuating means comprising a brake plate, hydraulic cylinder means, a pair of relatively movable pistons in the cylinder, and motion reversing linkage coupling the pistons and including a fulcrum abutment with a part fixed with respect to said plate and responsive to inward movement of one piston to urge the other piston in an inward direction.

References Cited in the file of this patent
UNITED STATES PATENTS

| | | |
|---|---|---|
| 1,889,093 | Gunn | Nov. 29, 1932 |
| 2,140,385 | Hunt et al. | Dec. 13, 1938 |
| 2,375,392 | Stelzer | May 8, 1945 |
| 2,382,268 | Stelzer | Aug. 14, 1945 |
| 2,657,768 | Hunyady | Nov. 3, 1953 |